(12) United States Patent
Oishi et al.

(10) Patent No.: US 12,028,573 B2
(45) Date of Patent: Jul. 2, 2024

(54) DEVICE AND METHOD FOR DETECTING DISPLAY OF PROVIDED CREDIT, AND PROGRAM

(71) Applicant: NIPPON TELEGRAPH AND TELEPHONE CORPORATION, Tokyo (JP)

(72) Inventors: Yasunori Oishi, Tokyo (JP); Takahito Kawanishi, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 673 days.

(21) Appl. No.: 15/734,864

(22) PCT Filed: May 13, 2019

(86) PCT No.: PCT/JP2019/018883
§ 371 (c)(1),
(2) Date: Dec. 3, 2020

(87) PCT Pub. No.: WO2019/235137
PCT Pub. Date: Dec. 12, 2019

(65) Prior Publication Data
US 2021/0240993 A1 Aug. 5, 2021

(30) Foreign Application Priority Data
Jun. 5, 2018 (JP) .................. 2018-108007

(51) Int. Cl.
*H04N 21/44* (2011.01)
*G06F 18/214* (2023.01)
(Continued)

(52) U.S. Cl.
CPC ..... *H04N 21/44008* (2013.01); *G06F 18/214* (2023.01); *G06N 5/04* (2013.01);
(Continued)

(58) Field of Classification Search
CPC .......... H04N 21/44008; H04N 21/433; G06N 20/00; G06N 5/04; G06V 10/454;
(Continued)

(56) References Cited

U.S. PATENT DOCUMENTS 7,555,195 B2 * 6/2009 Yamashita ......... G06Q 20/1235
386/353
7,712,123 B2 * 5/2010 Miyaoku .......... H04N 21/25883
369/2
(Continued)

FOREIGN PATENT DOCUMENTS

| EP | 1150503 A2 * | 10/2001 | ........... G11B 27/102 |
| JP | 201460642 A | 4/2014 | |
| WO | 2010079559 A1 | 7/2010 | |

OTHER PUBLICATIONS

Merler et al. (2012) "Semantic Model Vectors for Complex Video Event Recognition," IEEE Transactions on Multimedia, vol. 14, No. 1, pp. 88-101.

*Primary Examiner* — Manav Seth (57) ABSTRACT

The present invention enables detection of a sponsorship credit display in a broadcast program with higher precision. A sponsorship credit display detection device 100 according to the present invention includes: a learning data creation unit 140 that creates, as learning data, from a broadcast program in which the sponsorship credit display has been detected, a still image where the sponsorship credit display is displayed and a still image where the sponsorship credit display is not displayed; a learning unit 150 that uses the learning data created by the learning data creation unit 140 to learn a parameter to be applied to a detection model for
(Continued)

detecting a sponsorship credit display in a broadcast program; and a sponsorship credit display detection unit 170 that uses the detection model to which the parameter learned by the learning unit 150 has been applied to detect a sponsorship credit display in a recognition target broadcast program.

20 Claims, 7 Drawing Sheets

(51) Int. Cl.
| | |
|---|---|
| *G06N 5/04* | (2023.01) |
| *G06N 20/00* | (2019.01) |
| *G06V 10/44* | (2022.01) |
| *G06V 10/82* | (2022.01) |
| *G06V 20/40* | (2022.01) |
| *H04N 21/433* | (2011.01) |

(52) U.S. Cl.
CPC ........... *G06N 20/00* (2019.01); *G06V 10/454* (2022.01); *G06V 10/82* (2022.01); *G06V 20/46* (2022.01); *H04N 21/433* (2013.01); *G06V 20/44* (2022.01); *G06V 2201/02* (2022.01)

(58) Field of Classification Search
CPC .... G06V 20/46; G06V 10/82; G06V 2201/02; G06V 20/44; G06F 18/214
See application file for complete search history.

(56) References Cited

U.S. PATENT DOCUMENTS

| | | | | |
|---|---|---|---|---|
| 8,528,036 | B2* | 9/2013 | Davis | H04N 21/42203 |
| | | | | 725/62 |
| 8,712,831 | B2* | 4/2014 | Cline, Jr. | H04N 21/812 |
| | | | | 705/14.43 |
| 8,891,934 | B2* | 11/2014 | Messmer | G11B 27/031 |
| | | | | 348/461 |
| 10,089,533 | B2* | 10/2018 | Katz | G06Q 30/0273 |
| 10,095,219 | B2* | 10/2018 | Sinn | G05B 19/4068 |
| 10,255,505 | B2* | 4/2019 | Katz | H04N 21/44204 |
| 10,268,181 | B1* | 4/2019 | Nevins | B33Y 10/00 |
| 11,202,105 | B2* | 12/2021 | Blaney | H04N 21/2668 |
| 11,368,762 | B2* | 6/2022 | Oishi | G06V 10/82 |
| 11,412,304 | B2* | 8/2022 | Oishi | G11B 27/323 |
| 11,645,845 | B2* | 5/2023 | Oishi | H04N 21/251 |
| | | | | 725/42 |
| 2002/0069408 | A1* | 6/2002 | Abe | H04H 60/63 |
| | | | | 348/E7.063 |
| 2002/0184623 | A1* | 12/2002 | Hodge | H04N 21/47 |
| | | | | 725/39 |
| 2004/0107435 | A1* | 6/2004 | Anzai | H04N 21/8549 |
| | | | | 348/E7.071 |
| 2008/0016089 | A1* | 1/2008 | Nishiyama | H04N 9/8233 |
| | | | | 386/E9.041 |
| 2012/0019717 | A1 | 1/2012 | Mase | |
| 2015/0262255 | A1* | 9/2015 | Khajehnouri | G06Q 30/0276 |
| | | | | 705/14.66 |
| 2021/0241323 | A1* | 8/2021 | Oishi | H04N 21/4394 |
| 2023/0216598 | A1* | 7/2023 | Oishi | H04N 21/23418 |
| | | | | 725/19 |

* cited by examiner

DEVICE AND METHOD FOR DETECTING DISPLAY OF PROVIDED CREDIT, AND PROGRAM

CROSS-REFERENCE TO RELATED APPLICATIONS

This application is a U.S. 371 Application of International Patent Application No. PCT/JP2019/018883, filed on 13 May 2019, which application claims priority to and the benefit of JP Application No. 2018-108007, filed on 5 Jun. 2018, the disclosures of which are hereby incorporated herein by reference in their entireties.

TECHNICAL FIELD

The present invention relates to a sponsorship credit display detection device, a sponsorship credit display detection method, and a computer program that detect, in a broadcast program, a sponsorship credit display indicating a sponsor of that broadcast program.

BACKGROUND ART

NPL 1 discloses technology for performing image analysis on a moving image to detect various events occurring in the moving image. In this technology, information such as the location where the moving image was captured, and objects, people, and the like appearing in the moving image are digitized and expressed as feature vectors, and these feature vectors are used to detect various events (such as a birthday party, a tire change, cooking, a parade, or the like) occurring in the moving image.

PRIOR ART

Non Patent Literature

[NPL 1] M. Merler, B. Huang, L. Xie, G. Hua, and A. Natsev, "Semantic Model Vectors for Complex Video Event Recognition", IEEE Transactions on Multimedia, vol. 14, no. 1, 586, pp. 88-101, 2012.

SUMMARY OF THE INVENTION

Technical Problem

For example, a broadcast program that is broadcast by television broadcasting or the like may include a commercial (hereinafter referred to as a "CM" (Commercial Message)) and a sponsorship credit display that indicates a sponsor of the broadcast program. In recent years, in order to measure the effects of a CM or the like, there are demands to specify and count CMs in broadcast programs. Further, there are demands to distinguish whether a specified CM is a CM by a sponsor of the broadcast program (hereinafter referred to as a "time CM"), or a CM broadcast in a broadcast frame defined by a broadcasting station (hereinafter referred to as a "spot CM"). A time CM is a CM associated with a broadcast program, whereas a spot CM is a CM that is not associated with a broadcast program. Therefore, in order to distinguish between a time CM and a spot CM included in a broadcast program, it is useful to detect a sponsorship credit display indicating a sponsor of that broadcast program.

Conventionally, a sponsorship credit display is visually confirmed by a worker, which leads to an increase in cost.

Also, there are various variations of sponsorship credit displays, and with the technology described in NPL 1, it is difficult to precisely detect sponsorship credit displays having various variations.

The present invention was made in consideration of the above sort of problem, and it is an object of the present invention to provide a sponsorship credit display detection device, a sponsorship credit display detection method, and a computer program that enable detection of a sponsorship credit display in a broadcast program with higher precision.

Means for Solving the Problem

In order to solve the above problems, a sponsorship credit display detection device according to the present invention is a sponsorship credit display detection device that detects, in a broadcast program, a sponsorship credit display indicating a sponsor of the broadcast program, the sponsorship credit display detection device including: a learning data creation unit that creates, as learning data, from a broadcast program in which the sponsorship credit display has been detected, a still image where the sponsorship credit display is displayed and a still image where the sponsorship credit display is not displayed; a learning unit that uses the learning data created by the learning data creation unit to learn a parameter to be applied to a detection model for detecting a sponsorship credit display in a broadcast program; and a sponsorship credit display detection unit that uses the detection model to which the parameter learned by the learning unit has been applied to detect a sponsorship credit display in a recognition target broadcast program.

Also, in order to solve the above problems, a sponsorship credit display detection method according to the present invention is a sponsorship credit display detection method in a sponsorship credit display detection device that detects, in a broadcast program, a sponsorship credit display indicating a sponsor of that broadcast program, the sponsorship credit display detection method including steps of: creating, as learning data, from a broadcast program in which the sponsorship credit display has been detected, a still image with the sponsorship credit display and a still image without the sponsorship credit display; using the created learning data to learn a parameter to be applied to a detection model for detecting a sponsorship credit display in a broadcast program; and using the detection model to which the learned parameter has been applied to detect a sponsorship credit display in a recognition target broadcast program.

Also, in order to solve the above problem, a computer program according to the present invention causes a computer to function as the above sponsorship credit display detection device.

Effects of the Invention

According to a sponsorship credit display detection device, a sponsorship credit display detection method, and a computer program according to the present invention, it is possible to detect a sponsorship credit display in a broadcast program with higher precision.

DESCRIPTION OF EMBODIMENTS

Hereinafter, embodiments for carrying out the present invention will be described in detail with reference to the figures.

First Embodiment

Figure 1:
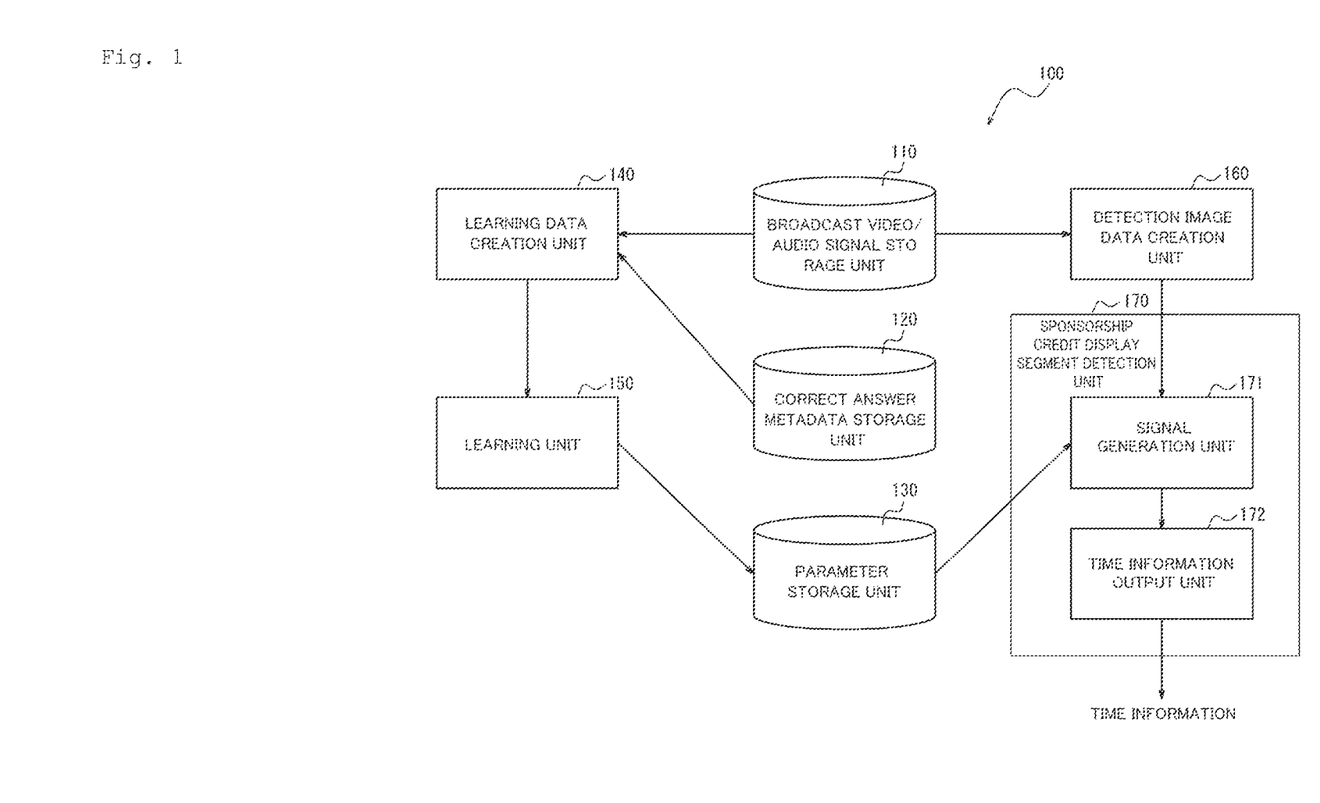
FIG. 1 shows an example configuration of a sponsorship credit display detection device according to a first embodiment of the present invention.

FIG. 1 shows an example configuration of a sponsorship credit display detection device 100 according to a first embodiment of the present invention. The sponsorship credit display detection device 100 according to the present embodiment detects, in a broadcast program, a sponsorship credit display indicating a sponsor of that broadcast program.

The sponsorship credit display detection device 100 shown in FIG. 1 includes a broadcast video/audio signal storage unit 110, a correct answer metadata storage unit 120, a parameter storage unit 130, a learning data creation unit 140, a learning unit 150, a detection image data creation unit 160, and a sponsorship credit display detection unit 170. The sponsorship credit display detection unit 170 includes a signal generation unit 171 and a time information output unit 172.

The broadcast video/audio signal storage unit 110 stores a broadcast video/audio signal obtained by encoding a broadcasted program with a fixed time length (for example, 65 minutes). In the broadcast video/audio signal storage unit 110, for example, a signal obtained by encoding the video signal of a broadcast program according to the H.264 standard and a signal obtained by encoding the audio signal of the broadcast program according to the AAC (Advanced Audio Coding) standard are stored in the MP4 file format. The broadcast video/audio signal storage unit 110, for example, stores a broadcast video/audio signal of a broadcast program in which the time when a sponsorship credit display is displayed has been detected by a worker or the like (hereinafter referred to as a "broadcast program whose sponsorship credit display has been detected"), and a broadcast video/audio signal of a broadcast program that is the sponsorship credit display detection target (hereinafter referred to as a "recognition target broadcast program"). It should be noted that the broadcast video/audio signal storage unit 110 is not limited to storing a video/audio signal of a broadcast program, and may also store a video/audio signal of a broadcast program for Internet distribution.

The correct answer metadata storage unit 120 stores time information indicating the time when the sponsorship credit display was displayed in the broadcast program. The time at which the sponsorship credit display was displayed is, for example, visually confirmed in advance by a worker and stored in the correct answer metadata storage unit 120.

The parameter storage unit 130 stores parameters to be applied to a detection model for detecting the sponsorship credit display in the broadcast program, described later. The detection model is, for example, a model using a convolutional neural network. Although a detailed description is omitted, a convolutional neural network generally has a configuration in which a convolution layer and a pooling layer are repeatedly arranged in this order from an input side a plurality of times, and then a fully connected layer is arranged. In the convolution layer, processing that applies a convolution filter to an input image is performed. In the pooling layer, processing is performed in which a rectangular filter is applied to the output of the convolution layer while sequentially shifting the filter, and the maximum value in the rectangular filter is extracted to generate a new image. In the fully-combined layer, processing is performed in which image data from which characteristic portions have been extracted by the convolution layer and the pooling layer is combined into one node, and a value converted by an activation function is output. For example, when the detection model is a model using a convolutional neural network, the parameter storage unit 130 stores a filter weight of the filter applied in each layer, a bias parameter added to the output of the convolution layer, and the like.

The learning data creation unit 140 acquires, from the broadcast video/audio signal storage unit 110, the video signal of a broadcast program for which a sponsorship credit display has been detected. In addition, the learning data creation unit 140 acquires the time information indicating the time when the sponsorship credit display was displayed from the correct answer metadata storage unit 120. As learning data, from the broadcast program for which the sponsorship credit display has been detected, the learning data creation unit 140 creates a still image in which the sponsorship credit display is displayed (hereinafter referred to as a "still image with the sponsorship credit display") and a still image in which the sponsorship credit is not displayed (hereinafter referred to as a "still image without the sponsorship credit display").

Specifically, the learning data creation unit 140 decodes the acquired video signal and creates still images that are continuous in time-series at predetermined time intervals. It should be noted that the still images may be created using only an I frame that has been intra-coded between screens. For example, the learning data creation unit 140 creates a still image every one second. In this case, the learning data creation unit 140 creates, for example, 3900 still images that are continuous in time-series at 1-second intervals for a 65-minute broadcast program.

Next, the learning data creation unit 140 extracts still images with the sponsorship credit display from the generated still images based on the acquired time information. Further, the learning data creation unit 140 extracts still images without the sponsorship credit display from the generated still images. Still images without the sponsorship credit display are randomly extracted from the still images at times other than the time indicated by the acquired time information. The learning data creation unit 140 extracts, for example, about 8000 still images with the sponsorship credit display and about 8000 still images without the sponsorship credit display. For example, when the broadcast time period of the broadcast program whose sponsorship credit display has been detected is 65 minutes, the learning data creation unit 140 performs the above-described processing for a plurality of broadcast programs and extracts the required number of still images. The learning data creation unit 140 outputs extracted still images with the sponsorship credit display and extracted still images without the sponsorship credit display to the learning unit 150 as learning data.

The learning unit 150 learns parameters to be applied to the detection model for detecting the sponsorship credit display in the broadcast program using the learning data created by the learning data creation unit 140 (the still images with the sponsorship credit display and the still images without the sponsorship credit display). For example, when the detection model is a model using the above convolutional neural network, the learning unit 150 learns the filter weight and the bias parameters by using a probabilistic gradient method. The learning unit 150 stores the learned parameters in the parameter storage unit 130.

The detection image data creation unit 160 acquires the video signal of the broadcast program that is the recognition target from the broadcast video/audio signal storage unit 110. The detection image data creation unit 160 decodes the video signal of the acquired recognition target broadcast program, and creates still images that are continuous in time-series at predetermined time intervals. For example, the detection image data creation unit 160 creates a still image every one second. In this case, the detection image data creation unit 160 creates, for example, 3900 still images that are continuous in time-series at 1-second intervals for a 65-minute broadcast program. The detection image data creation unit 160 outputs the created still images that are continuous in time-series to the signal generation unit 171.

The sponsorship credit display detection unit 170 uses the detection model to which the parameters learned by the learning unit 150 have been applied to detect a sponsorship credit display in the recognition target broadcast program. As described above, the sponsorship credit display detection unit 170 includes the signal generation unit 171 and the time information output unit 172.

The signal generation unit 171 sequentially inputs detection image data (still images that are continuous in time-series of the recognition target broadcast program) that has been output from the detection image data creation unit 160 to the detection model for detecting a sponsorship credit display in the broadcast program. Then, the signal generation unit 171 generates a time-series signal indicating in time-series the presence or absence of a sponsorship credit in each still image based on the output value of the detection model for each still image. Here, the signal generation unit 171 applies parameters stored in the parameter storage unit 130 to the detection model.

Specifically, for example, when the detection model is a model using a convolutional neural network, the signal generation unit 171 constructs a network (detection model) in which parameters stored in the parameter storage unit 130 are fixed values. When the output value of the detection model is at least a predetermined threshold value, the signal generation unit 171 determines that the input still image is a still image with the sponsorship credit display, and for example, outputs a signal "1". When the output value of the detection model is less than the predetermined threshold value, the signal generation unit 171 determines that the input still image is a still image without the sponsorship credit display, and for example, outputs a signal "0". The signal generation unit 171 performs the above-described determination for each still image continuous in time-series of the recognition target broadcast program, generates a binary time-series signal indicating the presence or absence of a sponsorship credit display in each still image with a signal "0" or a signal "1", and outputs the generated binary time-series signal to the time information output unit 172.

The time information output unit 172, in the binary time-series signal generated by the signal generation unit 171, detects a segment where still images determined to have a sponsorship credit display continue for at least a predetermined time period as a sponsorship credit display segment where the sponsorship credit display is displayed. Then, the time information output unit 172 outputs time information of the detected sponsorship credit display segment.

Specifically, with an objective of noise reduction, the time information output unit 172 applies a median filter to the binary time-series signal generated by the signal generation unit 171. Then, the time information output unit 172, in the time-series signal after median filter processing, detects a segment where still images determined to have a sponsorship credit display continue for at least a predetermined time period (in the above example, a segment where signals "1" are continuously arranged for at least the predetermined time period) as a sponsorship credit display segment. In a case where still images have been created at 1-second intervals, for example, if signals "1" are continuously arranged from the 300th to the 310th still images, the time information output unit 172 detects a segment from 5 minutes 00 seconds to 5 minutes 10 seconds as a sponsorship credit display segment, and outputs this time information.

Figure 2:
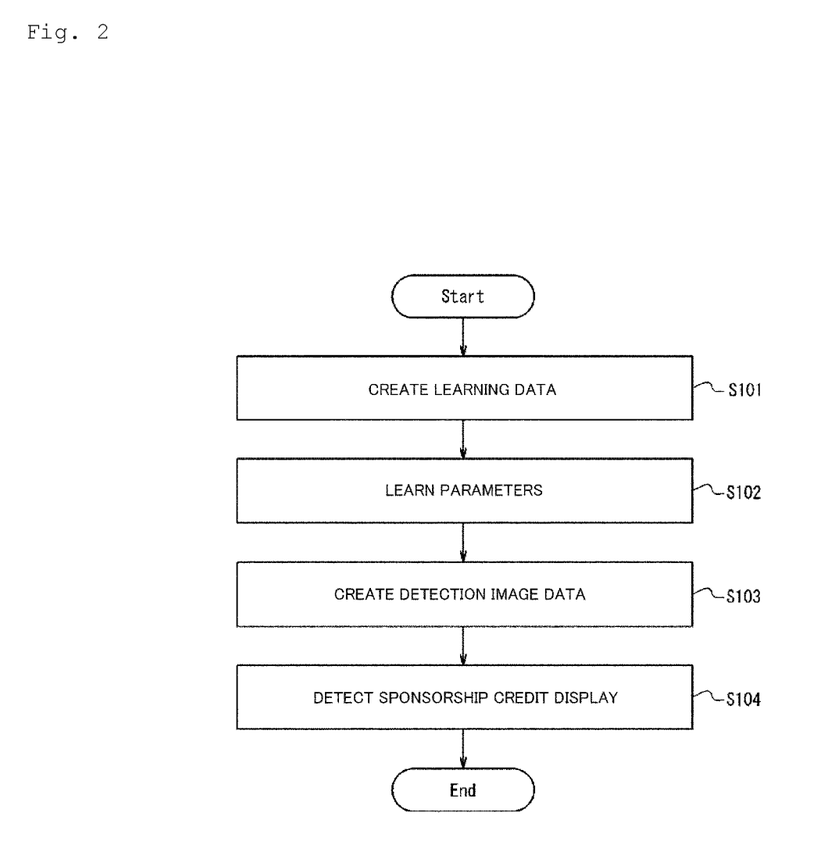
FIG. 2 is a flowchart showing an example of a sponsorship credit display detection method in the sponsorship credit display detection device shown in FIG. 1.

Next, the sponsorship credit display detection method in the sponsorship credit display detection device 100 according to the present embodiment will be described with reference to the flowchart shown in FIG. 2.

First, the learning data creation unit 140 creates, as learning data, from a broadcast program in which the sponsorship credit display has been detected, a still image with the sponsorship credit display and a still image without the sponsorship credit display (step S101).

Next, the learning unit 150 uses the created learning data to learn parameters to be applied to the detection model for detecting a sponsorship credit display in the broadcast program (step S102).

Next, the detection image data creation unit 160 creates, as detection image data, still images that are continuous in time-series of the recognition target broadcast program from the recognition target broadcast program (step S103).

Next, the sponsorship credit display detection unit 170 inputs the still images that are continuous in time-series of the recognition target broadcast program that were created as detection image data by the detection image data creation unit 160 to the detection model to which the learned parameter has been applied, and detects a sponsorship credit display in the recognition target broadcast program (step S104).

In the sponsorship credit display, white characters, colored characters, and the like surrounded with a black frame may be used in some cases as the characters indicating a sponsor name. Further, in the sponsorship credit display, characters of various fonts may be used in some cases as the characters indicating the sponsor name. Further, even in the sponsorship credit display, there are cases where the characters "sponsor" are included and cases where the characters "sponsor" are not included. Further, the sponsorship credit display may include only a sponsor logo. Further, the position of the sponsorship credit display may be the entire screen, lower right, lower left, upper right, upper left, or lower center. As described above, the sponsorship credit display has various variations. It is difficult to detect such various variations of the sponsorship credit display using, for example, a feature vector of an object appearing in an image.

In consideration of this fact, in the present embodiment, the sponsorship credit display detection device 100 includes the learning data creation unit 140, the learning unit 150, and the sponsorship credit display detection unit 170. The learning data creation unit 140 creates, as learning data, from a broadcast program in which a sponsorship credit display has been detected, still images where the sponsorship credit display is displayed and still images where the sponsorship credit display is not displayed. The learning unit 150 uses the learning data created by the learning data creation unit 140 to learn parameters to be applied to a detection model for detecting a sponsorship credit display in a broadcast program. The sponsorship credit display detection unit 170 uses the detection model to which the parameter learned by the learning unit 150 has been applied to detect a sponsorship credit display in a recognition target broadcast program. Therefore, by using sponsorship credit displays of various variations as the learning data, it is possible to detect sponsorship credit displays with various variations as described above, and it is possible to detect sponsorship credit displays with higher precision.

Second Embodiment

Figure 3:
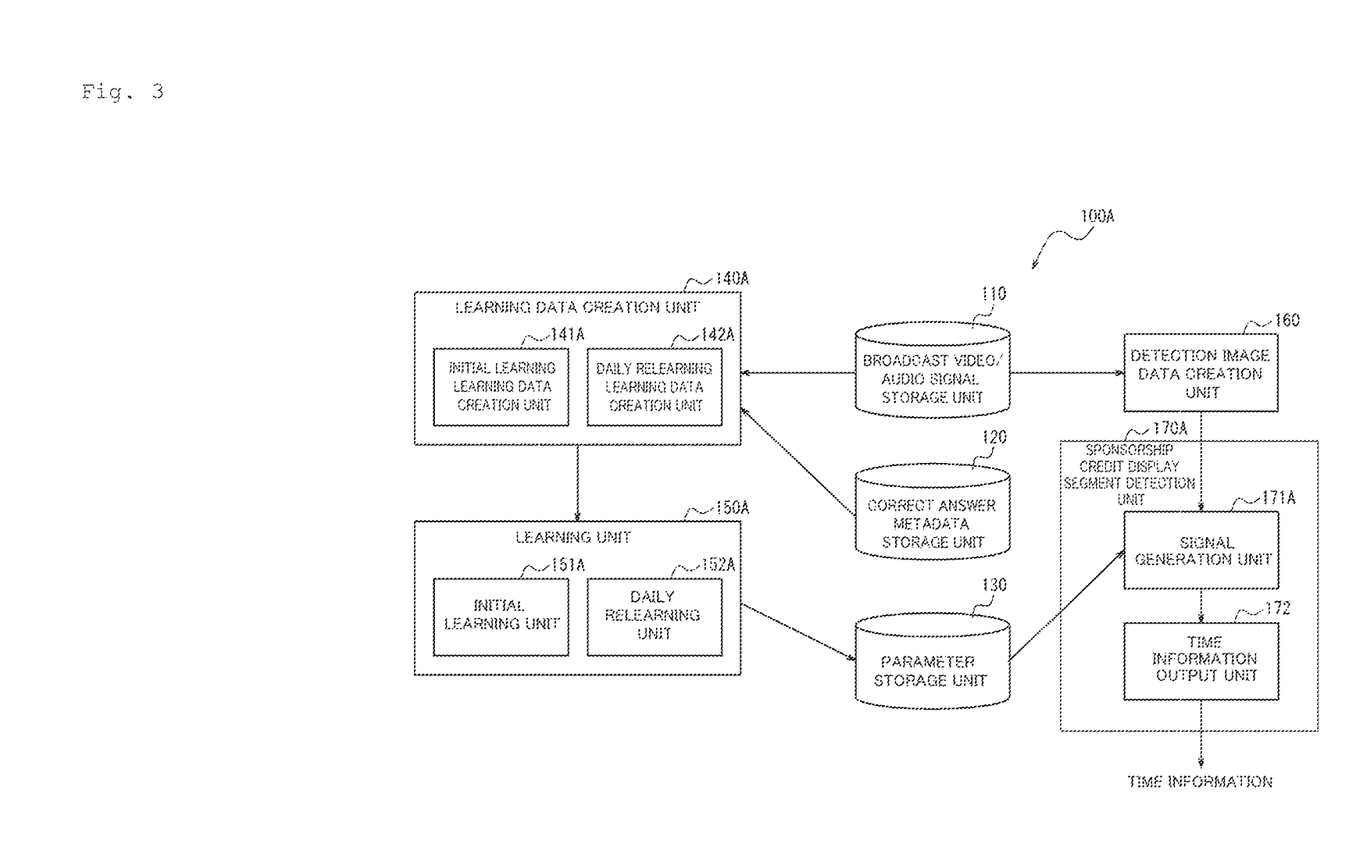
FIG. 3 shows an example configuration of a sponsorship credit display detection device according to a second embodiment of the present invention.

FIG. 3 shows an example configuration of a sponsorship credit display detection device 100A according to a second embodiment of the present invention. In FIG. 3, the same configurations as those in FIG. 1 are designated by the same reference signs, and a description thereof will be omitted here.

It is common for the same broadcast program to often be broadcast on the same day every week. In such a broadcast program, a sponsorship credit display tends to be displayed in the same format. The sponsorship credit display detection device 100A according to the present embodiment uses such a tendency to further improve the precision of sponsorship credit display detection.

The sponsorship credit display detection device 100A shown in FIG. 3 differs from the sponsorship credit display detection device 100 shown in FIG. 1 in that the learning data creation unit 140 is changed to a learning data creation unit 140A, the learning unit 150 is changed to a learning unit 150A, and the sponsorship credit display detection unit 170 is changed to a sponsorship credit display detection unit 170A.

The learning data creation unit 140A acquires, for each day of the week, the video signal of a broadcast program for which a sponsorship credit display has been detected from the broadcast video/audio signal storage unit 110. Further, the learning data creation unit 140A acquires the time information of the sponsorship credit display in that broadcast program from the correct answer metadata storage unit 120. The learning data creation unit 140A creates learning data for each day of the week from the broadcast program of each day of the week in which the acquired sponsorship credit display has been detected, and outputs the learning data to the learning unit 150A. The learning data creation unit 140A includes an initial learning learning data creation unit 141A, and a daily relearning learning data creation unit 142A.

The initial learning learning data creation unit 141A acquires the video signal of a broadcast program for which the sponsorship credit display has been detected from the broadcast video/audio signal storage unit 110. For example, the initial learning learning data creation unit 141A acquires the video signal of a broadcast program for one day one month ago. Further, the initial learning learning data creation unit 141A acquires the time information of a sponsorship credit display in the broadcast program for which the video signal was acquired from the correct answer metadata storage unit 120. Then, the initial learning learning data creation unit 141A creates learning data for initial learning of the detection model from the broadcast program in which the sponsorship credit display was detected, based on the time information of the sponsorship credit display in that broadcast program.

Specifically, the initial learning learning data creation unit 141A decodes the acquired video signal and creates still images that are continuous in time-series at predetermined time intervals. For example, the initial learning learning data creation unit 141A creates a still image every one second. In this case, the initial learning learning data creation unit 141A creates, for example, 3900 still images that are continuous in time-series at 1-second intervals for a 65-minute broadcast program.

Next, the initial learning learning data creation unit 141A extracts still images with the sponsorship credit display from the generated still images based on the acquired time information. Also, the initial learning learning data creation unit 141A extracts still images without the sponsorship credit display from the generated still images. The still images without the sponsorship credit display are randomly extracted from the still images at times other than the time indicated by the acquired time information. The initial learning learning data creation unit 141A extracts, for example, about 8000 still images with the sponsorship credit display and about 8000 still images without the sponsorship credit display. The initial learning learning data creation unit 141A outputs the extracted still images with the sponsorship credit display and the extracted still images without the sponsorship credit display to the learning unit 150A as learning data for initial learning of the detection model.

The daily relearning learning data creation unit 142A acquires, for each day of the week, the video signal of a broadcast program for which the sponsorship credit display has been detected from the broadcast video/audio signal storage unit 110. For example, the daily relearning learning data creation unit 142A acquires the video signal of broadcast programs for each day one week ago. Further, the daily relearning learning data creation unit 142A acquires the time information of the sponsorship credit display in the broadcast programs for which the video signal was acquired from the correct answer metadata storage unit 120. Then, the daily relearning learning data creation unit 142A creates learning data for relearning of the detection model from the broadcast program in which the sponsorship credit display was detected, for each day of the week, based on the time information of the sponsorship credit display in that broadcast program.

Specifically, the daily relearning learning data creation unit 142A decodes the acquired video signal and creates still images that are continuous in time-series at predetermined time intervals. For example, the daily relearning learning data creation unit 142A creates still images every one second. In this case, the daily relearning learning data creation unit 142A creates, for example, 3900 still images that are continuous in time series at 1-second intervals for a broadcast program of 65 minutes.

Next, the daily relearning learning data creation unit 142A extracts still images with the sponsorship credit display from the generated still images based on the acquired time information. Also, the daily relearning learning data creation unit 142A extracts still images without the sponsorship credit display from the generated still images. The still images without the sponsorship credit display are randomly extracted from the still images at times other than the time indicated by the acquired time information. The daily relearning learning data creation unit 142A extracts, for example, about 1000 still images with the sponsorship credit display and about 1000 still images without the sponsorship credit display. The daily relearning learning data creation unit 142A performs the above processing for each day of the week. Then, the daily relearning learning data creation unit 142A outputs the still images with the sponsorship credit display and the still images without the sponsorship credit display that were extracted for each day of the week to the learning unit 150A as relearning data for each day of the week.

The learning unit 150A uses the learning data for each day of the week created by the learning data creation unit 140A to learn (relearn) the parameters to be applied to the detection model for each day of the week. The learning unit 150A includes an initial learning unit 151A and a daily relearning unit 152A.

The initial learning unit 151A uses the learning data for initial learning created by the initial learning learning data creation unit 141A to learn parameters to be applied to the detection model for detecting a sponsorship credit display in the broadcast program. For example, when the detection model is a model using the above convolutional neural network, the initial learning unit 151A learns the filter weight and the bias parameters by using a probabilistic gradient method. The initial learning unit 151A stores the learned parameters in the parameter storage unit 130.

The daily relearning unit 152A uses the relearning data for each day of the week created by the daily relearning learning data creation unit 142A to learn the parameters to be applied to the detection model for detecting a sponsorship credit display in the broadcast program for each day of the week. The daily relearning unit 152A stores the learned parameters in the parameter storage unit 130. That is, the daily relearning unit 152A learns the parameters to be applied to the detection model for each day of the week, and stores the parameters in the parameter storage unit 130. By learning (relearning) the parameters to be applied to the detection model using the relearning data for each day of the week, it is possible to set parameters suitable for detecting the sponsorship credit display in the broadcast program for each day of the week.

The sponsorship credit display detection unit 170A applies the parameters stored in the parameter storage unit 130, learned for the day of the week on which the recognition target broadcast program is broadcast, to the detection model, and detects a sponsorship credit display in the recognition target broadcast program. The sponsorship credit display detection unit 170A differs from the sponsorship credit display detection unit 170 in that the signal generation unit 171 is changed to a signal generation unit 171A.

The signal generation unit 171A sequentially inputs still images that are continuous in time-series of the recognition target broadcast program that have been output from the detection image data creation unit 160 to the detection model for detecting a sponsorship credit display in the broadcast program. Then, the signal generation unit 171A generates a time-series signal indicating in time-series the presence or absence of a sponsorship credit in each still image based on the output value of the detection model for each still image. Here, the signal generation unit 171A applies parameters learned for the day of the week on which the recognition target broadcast program is broadcast, and stored in the parameter storage unit 130, to the detection model.

Specifically, for example, when the detection model is a model using a convolutional neural network, the signal generation unit 171A constructs a network (detection model) in which parameters learned for the day of the week on which the recognition target broadcast program is broadcast, and stored in the parameter storage unit 130, are fixed values. When the output value of the detection model is at least a predetermined threshold value, the signal generation unit 171A determines that the input still image is a still image with the sponsorship credit display, and for example, outputs a signal "1". When the output value of the detection model is less than the predetermined threshold value, the signal generation unit 171A determines that the input still image is a still image without the sponsorship credit display, and for example, outputs a signal "0". The signal generation unit 171A performs the above-described determination for each still image continuous in time-series of the recognition target broadcast program, generates a binary time-series signal indicating the presence or absence of a sponsorship credit display in each still image with a signal "0" or a signal "1", and outputs the generated binary time-series signal to the time information output unit 172. It should be noted that a configuration may also be adopted in which the signal generation unit 171A constructs a detection model for each day of the week, to which the parameters learned for each day of the week by the learning unit 150A are respectively applied, and the signal generation unit 171A uses a detection model that corresponds to the day of the week on which the recognition target broadcast program is broadcast.

Next, results of evaluating precision of detection of a sponsorship credit display by the sponsorship credit display detection device 100A according to the present embodiment will be described.

Figure 4:
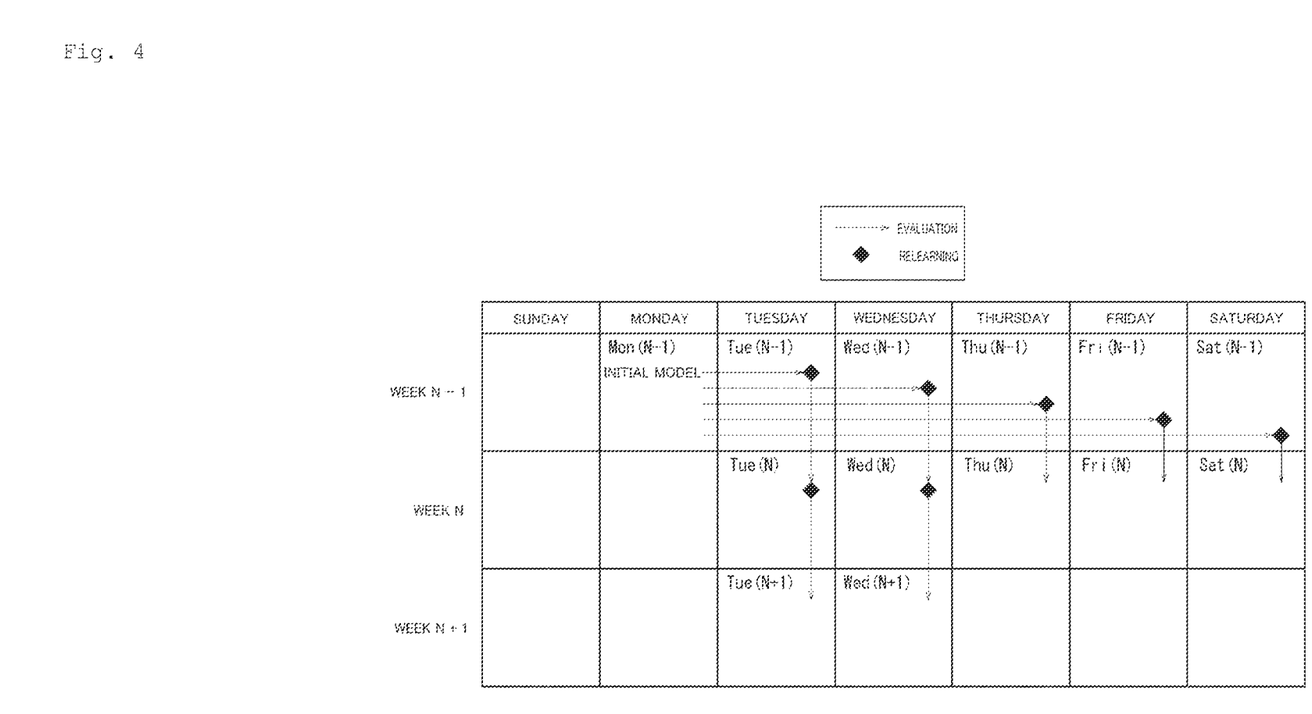
FIG. 4 is used to describe, in the sponsorship credit display detection device shown in FIG. 3, relearning using learning data for each day of the week, and evaluation of precision of detection of a sponsorship credit display.

FIG. 4 is used to describe, in the sponsorship credit display detection device 100A, relearning using learning data for each day of the week, and evaluation of precision of detection of a sponsorship credit display.

As shown in FIG. 4, first, a detection model (an initial model) was constructed in which the parameters learned using the initial learning data were applied to Monday (N−1) of week N−1. Then, using this initial model, sponsorship credit display detection was performed using a broadcast program of Tuesday (N−1) as the recognition target broadcast program. Similarly, for Wednesday (N−1), Thursday (N−1), Friday (N−1), and Saturday (N−1), sponsorship credit display detection was performed using the broadcast program of that particular day as the recognition target broadcast program. Next, a detection model obtained by applying parameters relearned using the relearning data for each day created from the broadcast program of the particular day was constructed for each of Tuesday (N−1), Wednesday (N−1), Thursday (N−1), Friday (N−1), and Saturday (N−1), and the initial model was updated.

Next, using the detection model constructed for Tuesday (N−1), sponsorship credit display detection was performed using the broadcast program on that day (Tuesday (N)) as the recognition target broadcast program. Similarly for Wednesday (N), Thursday (N), Friday (N), and Saturday (N), sponsorship credit display detection was performed using the broadcast program on that day as the recognition target broadcast program. Then, for Tuesday (N) of week N, a detection model obtained by applying the parameters relearned using the relearning data created from the broadcast program of the particular day was constructed, and the detection model constructed for Tuesday (N−1) of week N−1 was updated. Similarly for Wednesday (N), Thursday (N), Friday (N), and Saturday (N) of week N, a detection model obtained by applying parameters relearned using the relearning data created from the broadcast program of the particular day was constructed, and the detection model constructed for the prior week was updated.

Next, using the detection model constructed for Tuesday (N), sponsorship credit display detection was performed using the broadcast program on that day (Tuesday (N+1)) as the recognition target broadcast program. Similarly for Wednesday (N+1), sponsorship credit display detection was performed using the broadcast program on that day as the recognition target broadcast program. Then, for Tuesday (N+1) of week N+1, a detection model obtained by applying the parameters relearned using the relearning data created from the broadcast program of the particular day was constructed, and the detection model constructed for Tuesday (N) of week N was updated. Similarly for Wednesday (N) of week N, a detection model obtained by applying parameters relearned using the relearning data created from the broadcast program of the particular day was constructed, and the detection model constructed for the prior week was updated.

Figure 5A:
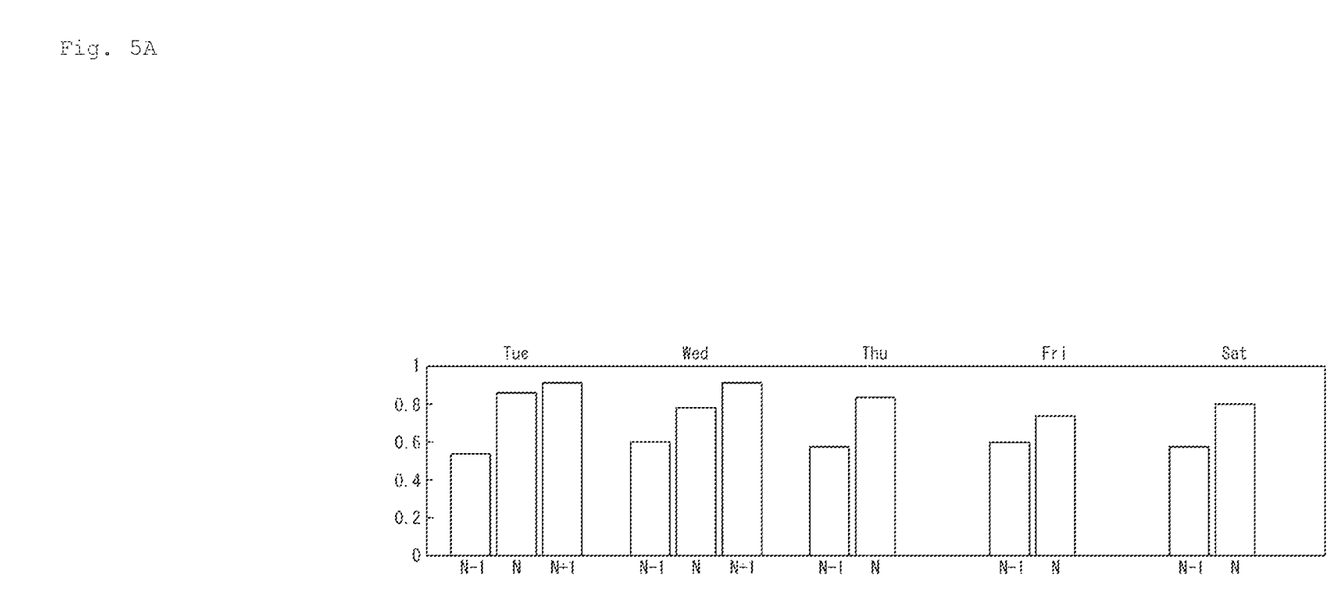
FIG. 5A shows evaluation results of the recall rate of detection of a sponsorship credit display by the sponsorship credit display detection device shown in FIG. 3.
Figure 5B:
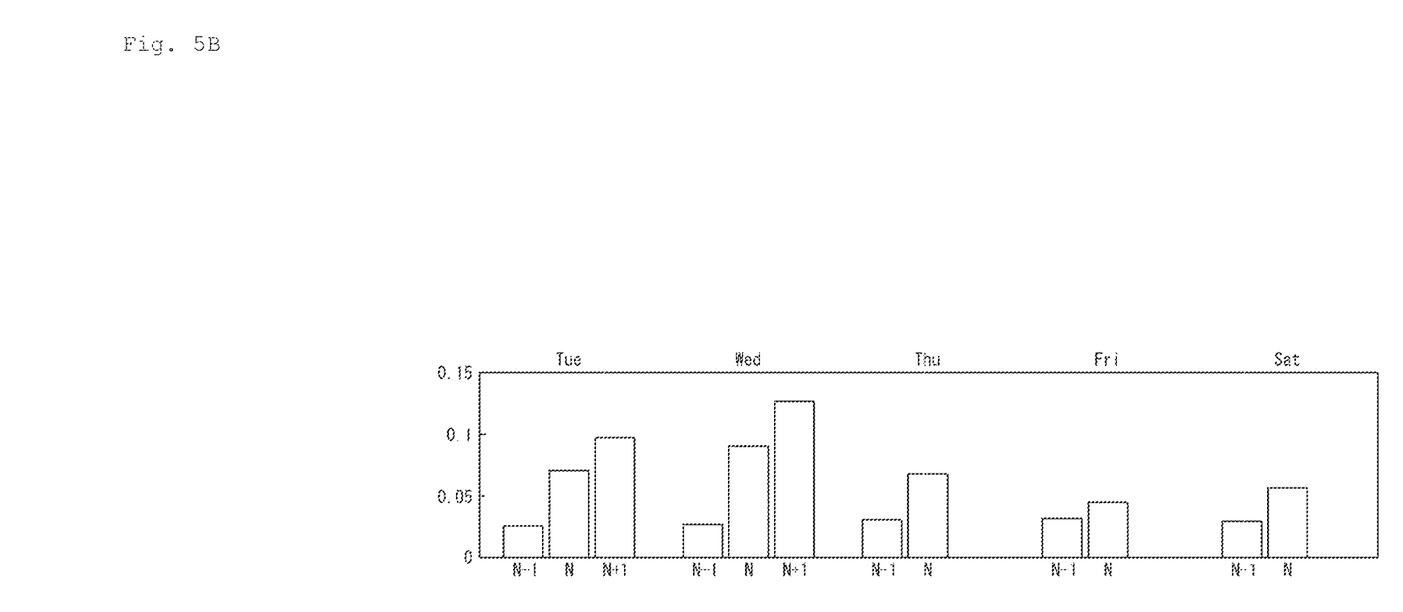
FIG. 5B shows evaluation results of the precision rate of detection of a sponsorship credit display by the sponsorship credit display detection device shown in FIG. 3.

FIG. 5A shows results of comparing the recall rate of detection of a sponsorship credit display by the sponsorship credit display detection device 100A, by day of the week, for week N−1 to week N+1, or from week N−1 to week N. Also, FIG. 5B shows results of comparing the precision rate of detection of a sponsorship credit display by the sponsorship credit display detection device 100A, by day of the week, for week N−1 to week N+1, or from week N−1 to week N. Note that the recall rate is a ratio of the actually detected sponsorship credit displays among sponsorship credit displays that should be detected. Also, the precision rate is a ratio of correctly detected sponsorship credit displays among items that were detected as sponsorship credit displays.

As shown in FIG. 5A, for any day of the week, the recall rate improves as relearning is repeated. Also, as shown in FIG. 5B, for any day of the week, the precision rate improves as relearning is repeated. Thus, by the learning unit 150A learning (relearning) for each day of the week using the latest learning data created by the learning data creation unit 140A, and updating the parameters to be applied to the detection model, it is possible to improve the precision of detection of a sponsorship credit display.

As described above, in the present embodiment, the sponsorship credit display detection device 100A includes the learning data creation unit 140A, the learning unit 150A, and the sponsorship credit display detection unit 170A. The learning data creation unit 140A creates learning data for each day of the week from a broadcast program in which a sponsorship credit display has been detected for each day of the week. The learning unit 150A uses the learning data for each day of the week created by the learning data creation unit 140A to learn parameters for each day of the week. The sponsorship credit display detection unit 170A applies the parameters learned for the day of the week on which the recognition target broadcast program is broadcast to the detection model, and detects a sponsorship credit display in the recognition target broadcast program.

It is common for the same broadcast program to often be broadcast on the same day every week. In such a broadcast program, a sponsorship credit display tends to be displayed in the same format. Therefore, by creating learning data for each day of the week, and using that learning data to learn parameters to be applied to a detection model for each day of the week, it is possible to improve the precision of detection of a sponsorship credit display. It should be noted that the present embodiment is described using an example in which creation of learning data and learning of parameters to be applied to the detection model are performed for each day of the week, but this is not a limitation. For example, creation of learning data and learning of parameters to be applied to the detection model may be performed separately for weekdays, Saturdays, and Sundays. Further, for example, creation of learning data and learning of parameters to be applied to the detection model may be performed for each broadcast program.

Also, in the present embodiment, the learning unit 150A, for each day of the week, performs learning (relearning) using the latest learning data created by the learning data creation unit 140A, and updates the parameters to be applied to the detection model. By repeating learning (relearning) using the latest learning data, it is possible to further improve the precision of detection of a sponsorship credit display.

Third Embodiment

Figure 6:
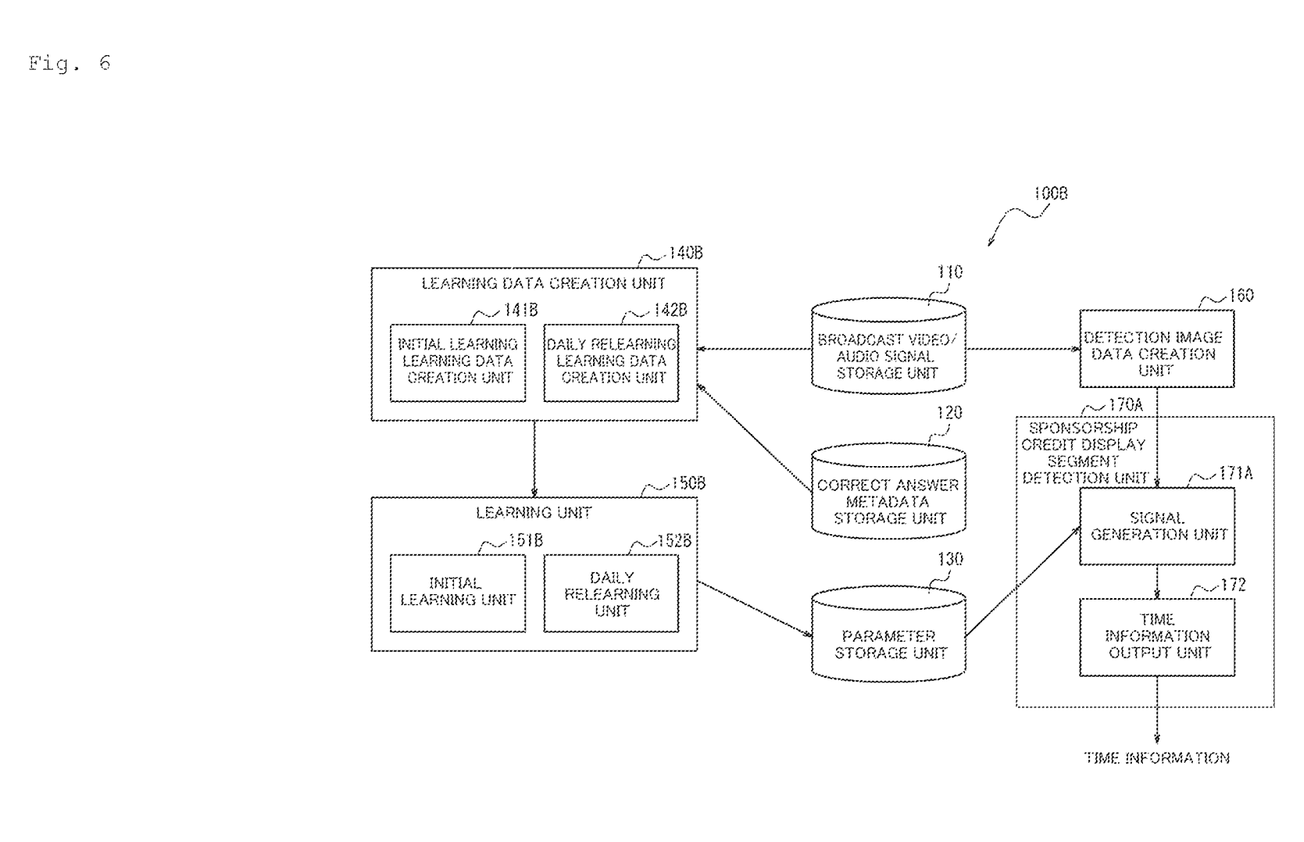
FIG. 6 shows an example configuration of a sponsorship credit display detection device according to a third embodiment of the present invention.

FIG. 6 shows an example configuration of a sponsorship credit display detection device 100B according to a third embodiment of the present invention. In FIG. 6, the same configurations as those in FIGS. 1 and 3 are designated by the same reference signs, and a description thereof will be omitted here.

It is common for the same broadcast program to often be broadcast in the same time zone on the same day every week. In such a broadcast program, a sponsorship credit display tends to be displayed in the same format. The sponsorship credit display detection device 100B according to the present embodiment utilizes such a tendency to further improve the precision of detection of a sponsorship credit display.

The sponsorship credit display detection device 100B shown in FIG. 6 differs from the sponsorship credit display detection device 100A shown in FIG. 3 in that the learning data creation unit 140A is changed to a learning data creation unit 140B, and the learning unit 150A is changed to a learning unit 150B.

The learning data creation unit 140B acquires, for each day of the week, the video signal of a broadcast program for which a sponsorship credit display has been detected from the broadcast video/audio signal storage unit 110. Further, the learning data creation unit 140B acquires the time information of the sponsorship credit display in that broadcast program from the correct answer metadata storage unit 120. The learning data creation unit 140B creates learning data for each day of the week from the broadcast program of each day of the week whose sponsorship credit display has been detected, and outputs the learning data to the learning unit 150B. Specifically, the learning data creation unit 140B creates as learning data, for each day of the week, from the broadcast program whose sponsorship credit display has been detected and time information of the sponsorship credit display, a still image with the sponsorship credit display and the time when the still image was broadcast, and a still image without the sponsorship credit display and the time when the still image was broadcast. The learning data creation unit 140B differs from the learning data creation unit 140A in that the initial learning learning data creation unit 141A is changed to the initial learning learning data creation unit 141B, and the daily relearning learning data creation unit 142A is changed to the daily relearning learning data creation unit 142B.

The initial learning learning data creation unit 141B acquires the video signal of a broadcast program whose sponsorship credit display has been detected from the broadcast video/audio signal storage unit 110. For example, the initial learning learning data creation unit 141B acquires the video signal of a broadcast program for one day one month ago. Further, the initial learning learning data creation unit 141B acquires the time information of the sponsorship credit display in the broadcast program for which the video signal was acquired from the correct answer metadata storage unit 120. Then, the initial learning learning data creation unit 141B creates learning data for initial learning of the detection model from the broadcast program whose sponsorship credit display has been detected, based on the time information of the sponsorship credit display in that broadcast program.

Specifically, the initial learning learning data creation unit 141B decodes the acquired video signal and creates still images that are continuous in time series at predetermined time intervals. For example, the initial learning learning data creation unit 141B creates a still image every one second. In this case, the initial learning learning data creation unit 141B creates, for example, 3900 still images that are continuous in time series at 1-second intervals for a broadcast program of 65 minutes.

Next, the initial learning learning data creation unit 141B, based on the acquired time information, extracts a still image with the sponsorship credit display from the generated still images, paired with the time when the still image was broadcast. In addition, the initial learning learning data creation unit 141B, based on the acquired time information, extracts a still image without the sponsorship credit display from the generated still images, paired with the time when the still image was broadcast. The still image without the sponsorship credit display is randomly extracted from the still images at times other than the time indicated by the acquired time information. The initial learning learning data creation unit 141B extracts, for example, about 8000 pairs each of the pair of a still image with the sponsorship credit display and the time when the still image was broadcast, and the pair of a still image without the sponsorship credit display and the time when the still image was broadcast. The initial learning learning data creation unit 141B outputs the pairs of a still image with the sponsorship credit display and the time when the still image was broadcast, and the pairs of a still image without the sponsorship credit display and the time when the still image was broadcast, that were extracted, to the learning unit 150B as learning data for initial learning of the detection model.

The daily relearning learning data creation unit 142B acquires, for each day of the week, the video signal of a broadcast program whose sponsorship credit display has been detected from the broadcast video/audio signal storage unit 110. For example, the daily relearning learning data creation unit 142B acquires the video signal of broadcast programs for each day one week ago. Further, the daily relearning learning data creation unit 142B acquires the time information of the sponsorship credit display in the broadcast programs for which the video signal was acquired from the correct answer metadata storage unit 120. Then, the daily relearning learning data creation unit 142B creates learning data for relearning of the detection model from the broadcast program whose sponsorship credit display was detected, for each day of the week, based on the time information of the sponsorship credit display in that broadcast program.

Specifically, the daily relearning learning data creation unit 142B decodes the acquired video signal and creates still images that are continuous in time-series at predetermined time intervals. For example, the daily relearning learning data creation unit 142B creates still images every one second. In this case, the daily relearning learning data creation unit 142B creates, for example, 3900 still images that are continuous in time series at 1-second intervals for a broadcast program of 65 minutes.

Next, the daily relearning learning data creation unit 142B, based on the acquired time information, extracts a still image with the sponsorship credit display from the generated still images, paired with the time when the still image was broadcast. In addition, the daily relearning learning data creation unit 142B, based on the acquired time information, extracts a still image without the sponsorship credit display from the generated still images, paired with the time when the still image was broadcast. The still image without the sponsorship credit display is randomly extracted from the still images at times other than the time indicated by the acquired time information. The daily relearning learning data creation unit 142B extracts, for example, about 1000 pairs each of the pair of a still image with the sponsorship credit display and the time when the still image was broadcast, and the pair of a still image without the sponsorship credit display and the time when the still image was broadcast. The daily relearning learning data creation unit 142B performs the above-described processing for each day of the week. Then, the daily relearning learning data creation unit 142B outputs the pairs of a still image with the sponsorship credit display and the time when the still image was broadcast, and the pairs of a still image without the sponsorship credit display and the time when the still image was broadcast, that were extracted for each day of the week, to the learning unit 150B as relearning data for each day of the week.

The learning unit 150B uses the learning data for each day of the week created by the learning data creation unit 140B to learn (relearn) the parameters to be applied to the detection model for each day of the week. The learning unit 150B includes an initial learning unit 151B and a daily relearning unit 152B.

The initial learning unit 151B learns parameters to be applied to the detection model for detecting the sponsorship credit display in the broadcast program using the learning data for initial learning created by the initial learning learning data creation unit 141B (the pairs of a still image with the sponsorship credit display and the time when the still image was broadcast, and the pairs of a still image without the sponsorship credit display and the time when the still image was broadcast). For example, when the detection model is a model using the above convolutional neural network, the initial learning unit 151B learns the filter weight and the bias parameters by using a probabilistic gradient method. The initial learning unit 151B stores the learned parameters in the parameter storage unit 130.

The daily relearning unit 152B uses the relearning data for each day of the week created by the daily relearning learning data creation unit 142B to learn the parameters to be applied to the detection model for detecting the sponsorship credit display in the broadcast program for each day of the week. The daily relearning unit 152B stores the learned parameters in the parameter storage unit 130. Here, the relearning data for each day of the week is, for each day of the week, pairs of a still image with the sponsorship credit display and the time when the still image was broadcast, and pairs of a still image without the sponsorship credit display and the time when the still image was broadcast.

It should be noted that, in the present embodiment, an example is illustrated in which the learning data creation unit 140B creates learning data for each day of the week, and the learning unit 150B uses the learning data created by the learning data creation unit 140B to learn the parameters to be applied to the detection model for each day of the week, but this is not a limitation. Here, the learning data is the pairs of a still image with the sponsorship credit display and the time when the still image was broadcast, and the pairs of a still image without the sponsorship credit display and the time when the still image was broadcast. As the learning data, the learning data creation unit 140B may also create pairs of a still image with the sponsorship credit display and the time when the still image was broadcast, and pairs of a still image without the sponsorship credit display and the time when the still image was broadcast, without distinguishing between the days of the week. That is, a configuration may be adopted in which the learning data creation unit 140B creates, as the learning data, from the broadcast program in which the sponsorship credit display has been detected, a still image with the sponsorship credit display and the time when the still image was broadcast, and a still image without the sponsorship credit display and the time when the still image was broadcast. Also, the learning unit 150B may learn the parameters applied to the detection model using the learning data created by the learning data creation unit 140B without distinguishing the days of the week.

As described above, in the present embodiment, the sponsorship credit display detection device 100B includes the learning data creation unit 140B that creates, as learning data, from a broadcast program in which a sponsorship credit display has been detected, a still image with the sponsorship credit display and the time when that still image was broadcast, and a still image without the sponsorship credit display and the time when that still image was broadcast.

Generally, the same broadcast program is often broadcast in the same time zone on the same day every week. In such a broadcast program, a sponsorship credit display tends to be displayed in the same format. Therefore, by creating, as the learning data, a still image with the sponsorship credit display and the time when the still image was broadcast, and a still image without the sponsorship credit display and the time when the still image was broadcast, and learning the parameters applied to the detection model using that learning data, it is possible to improve the precision of detection of the sponsorship credit display.

It should be noted that in the first to third embodiment described above, an example is described in which the detection model is constructed using a convolutional neural network, but this is not a limitation. The detection model for detecting the presence or absence of the sponsorship credit display may be constructed using, for example, an SVM (Support Vector Machine) or the like.

Although the sponsorship credit display detection devices 100, 100A, and 100B were described above, it is also possible to use a computer to function as the sponsorship credit display detection devices 100, 100A, and 100B. In such a computer, a computer program describing processing content that realizes each function of the sponsorship credit display detection devices 100, 100A, and 100B is stored in a storage unit of the computer, and these functions can be realized by a CPU of the computer reading and executing this computer program.

Also, the computer program may be recorded on a computer-readable recording medium. The computer program can be installed in a computer by using such a recording medium. In this case, the recording medium on which the computer program is recorded may be a non-transitory recording medium. The non-transitory recording medium is not particularly limited, but may be a recording medium such as a CD-ROM or a DVD-ROM, for example.

The above embodiments have been described as typical examples, but it will be obvious to those skilled in the art that many modifications and substitutions are possible within the spirit and scope of the present invention. Accordingly, the present invention should not be interpreted as being limited by the above-described embodiments, and various modifications and changes can be made without departing from the scope of the claims. For example, a plurality of constituent blocks described in the configuration figures of the embodiments can be combined into one constituent block, or one constituent block can be divided into a plurality of constituent blocks.

REFERENCE SIGNS LIST

100, 100A, 100B Sponsorship credit display detection device
110 Broadcast video/audio signal storage unit
120 Correct answer metadata storage unit
130 Parameter storage unit
140, 140A, 140B Learning data creation unit
141A, 141B Initial learning data creation unit
142A, 142B Daily relearning data creation unit
150, 150A, 150B Learning unit
151A, 151B Initial learning unit
152A, 152B Daily relearning unit
160 Detection image data creation unit
170, 170A Credit display detection unit
171, 171A Signal generation unit
172 Time information output unit

The invention claimed is:

1. A sponsorship credit data detection device for detecting, in a broadcast program, a sponsorship credit data indicating a sponsor of the broadcast program on a display screen, the device comprises a processor configured to execute operations comprising:
   creating, as learning data, from the broadcast program in which the sponsorship credit data has been detected, a first still image and a second still image, wherein the first still image includes the sponsorship credit data during the broadcast program, and the second still image is without the sponsorship credit data during the broadcast program;
   learning, using the learning data, a parameter to be applied to a detection model for detecting sponsorship credit data in a broadcast program; and
   detecting, using the detection model to which the parameter learned, sponsorship credit data in a recognition target broadcast program.

2. The sponsorship credit data detection device according to claim 1, the processor further configured to execute operations comprising:
   receiving still images of the recognition target broadcast program to the detection model in time-series;

generating, based on an output value of the detection model for each still image, a time-series signal, wherein the time-series signal indicates in time-series the presence or absence of sponsorship credit data in each still image;

detecting, in a time-series signal generated by the signal generator, a segment where the still images determined to have sponsorship credit data continue for at least a predetermined time period as a sponsorship credit display segment where the sponsorship credit data is displayed; and outputting provide time information of the detected sponsorship credit display segment.

3. The sponsorship credit display detection device according to claim 1, wherein the learning further comprises creating the learning data for each day of the week from a broadcast program in which the sponsorship credit data has been detected for each day of the week, wherein the creating the first still image and the second still image further comprises using the learning data for each day of the week to learn the parameter for each day of the week, and wherein the detecting further comprises detecting the sponsorship credit data in the recognition target broadcast program by applying the parameter learned for the day of the week when the recognition target broadcast program is broadcast to the detection model.

4. The sponsorship credit detection device according to claim 3, wherein the learning further comprises:

learning for each day of the week using the newest learning data created, and updating the parameter to be applied to the detection model.

5. The sponsorship credit detection device according to claim 1, wherein the creating the first still image and the second still image further comprises creating, as the learning data, from a broadcast program in which the sponsorship credit data has been detected:

the first still image with the sponsorship credit data and the time when the still image was broadcast, and the second still image without the sponsorship credit data and the time when the still image was broadcast.

6. A sponsorship credit detection method for detecting, in a broadcast program, sponsorship credit data indicating a sponsor of that broadcast program, the method comprising:

creating, as learning data, from the broadcast program in which the sponsorship credit data has been detected, a first still image with the sponsorship credit display and a second still image without the sponsorship credit data;

learning, using the created learning data, a parameter to be applied to a detection model for detecting sponsorship credit data in a broadcast program; and detecting, using the detection model to which the learned parameter has been applied, sponsorship credit data in a recognition target broadcast program.

7. A computer-readable non-transitory recording medium storing computer-executable program instructions that when executed by a processor cause a computer to execute operations comprising:

creating, as learning data, from a broadcast program in which the sponsorship credit data has been detected, a first still image and a second still image, wherein the first still image includes the sponsorship credit data during the broadcast program, and the second still image is without the sponsorship credit data during the broadcast program;

learning, using the learning data, a parameter to be applied to a detection model for detecting sponsorship credit data; and detecting, using the detection model to which the parameter, sponsorship credit data in a recognition target broadcast program.

8. The sponsorship credit detection method according to claim 6, the method further comprising:

receiving still images of the recognition target broadcast program to the detection model in time-series;

generating, based on an output value of the detection model for each still image, a time-series signal, wherein the time-series signal indicates in time-series the presence or absence of sponsorship credit data in each still image;

detecting, in a time-series signal, a segment where the still images determined to have sponsorship credit data continue for at least a predetermined time period as a sponsorship credit display segment where the sponsorship credit data is displayed; and outputting time information of the detected sponsorship credit display segment.

9. The sponsorship credit detection method according to claim 6, wherein the creating further comprises creating the learning data for each day of the week from the broadcast program in which the sponsorship credit data has been detected for each day of the week;

the learning further comprises learning the parameter for each day of the week by using the learning data for each day of the week; and the detecting further comprises detecting the sponsorship credit data in the recognition target broadcast program by applying the parameter learned for the day of the week when the recognition target broadcast program is broadcast to the detection model.

10. The sponsorship credit detection method according to claim 6, wherein the learning further comprises learning for each day of the week using the newest learning data created, and the method further comprising updating the parameter to be applied to the detection model.

11. The sponsorship credit detection method according to claim 6, wherein the creating further comprises creating, as the learning data, from the broadcast program in which the sponsorship credit data has been detected:

the first still image with the sponsorship credit data and the time when the still image was broadcast, and the second still image without the sponsorship credit data and the time when the still image was broadcast.

12. The computer-readable non-transitory recording medium according to claim 7, the program instruction when executed by the processor further causes the computer to execute operations comprising:

receiving still images of the recognition target broadcast program to the detection model in time-series;

generating, based on an output value of the detection model for each still image, a time-series signal indicating in time-series the presence or absence of sponsorship credit data in each still image;

detecting, in a time-series signal, a segment where still images determined to have sponsorship credit data continue for at least a predetermined time period as a sponsorship credit display segment where the sponsorship credit data is displayed; and outputting time information of the detected sponsorship credit display segment.

13. The computer-readable non-transitory recording medium according to claim 7, wherein the creating the first still image and the second still image further comprises creating the learning data for each day of the week from a broadcast program in which the sponsorship credit data has been detected for each day of the week, wherein the learning further comprises using the learning data for each day of the week to learn the parameter for each day of the week, and wherein the detecting the sponsorship credit data further comprises detecting the sponsorship credit data in the recognition target broadcast program by applying the parameter learned for the day of the week when the recognition target broadcast program is broadcast to the detection model.

14. The computer-readable non-transitory recording medium according to claim 7, wherein the learning further comprises:

learning for each day of the week using the newest learning data created and updating the parameter to be applied to the detection model.

15. The computer-readable non-transitory recording medium according to claim 7, wherein the learning further comprises creating, as the learning data, from a broadcast program in which the sponsorship credit data has been detected:

the first still image with the sponsorship credit data and the time when the still image was broadcast, and the second still image without the sponsorship credit data and the time when the still image was broadcast.

16. The sponsorship credit detection device according to claim 2, wherein the learning further comprises creating the learning data for each day of the week from a broadcast program in which the sponsorship credit data has been detected for each day of the week, wherein the learning further comprises using the learning data for each day of the week to learn the parameter for each day of the week, and wherein the detecting the sponsorship credit data further comprises detecting the sponsorship credit data in the recognition target broadcast program by applying the parameter learned for the day of the week when the recognition target broadcast program is broadcast to the detection model.

17. The sponsorship credit display detection device according to claim 2, wherein the learning further comprises creating, as the learning data, from the broadcast program in which the sponsorship credit data has been detected:

the first still image with the sponsorship credit data and the time when the still image was broadcast, and the second still image without the sponsorship credit data and the time when the still image was broadcast.

18. The sponsorship credit display detection method according to claim 9, wherein the creating further comprises creating, as the learning data, from the broadcast program in which the sponsorship credit data has been detected:

the first still image with the sponsorship credit data and the time when the still image was broadcast, and the second still image without the sponsorship credit data and the time when the still image was broadcast.

19. The sponsorship credit detection method according to claim 10, wherein the creating further comprises creating, as the learning data, from the broadcast program in which the sponsorship credit data has been detected:

the first still image with the sponsorship credit data and the time when the still image was broadcast, and a still image without the sponsorship credit data and the time when the still image was broadcast.

20. The computer-readable non-transitory recording medium according to claim 12, wherein the learning further comprises creating, as the learning data, from the broadcast program in which the sponsorship credit data has been detected:

the first still image with the sponsorship credit data and the time when the still image was broadcast, and the second still image without the sponsorship credit data and the time when the still image was broadcast.

* * * * *